Patented Jan. 5, 1943

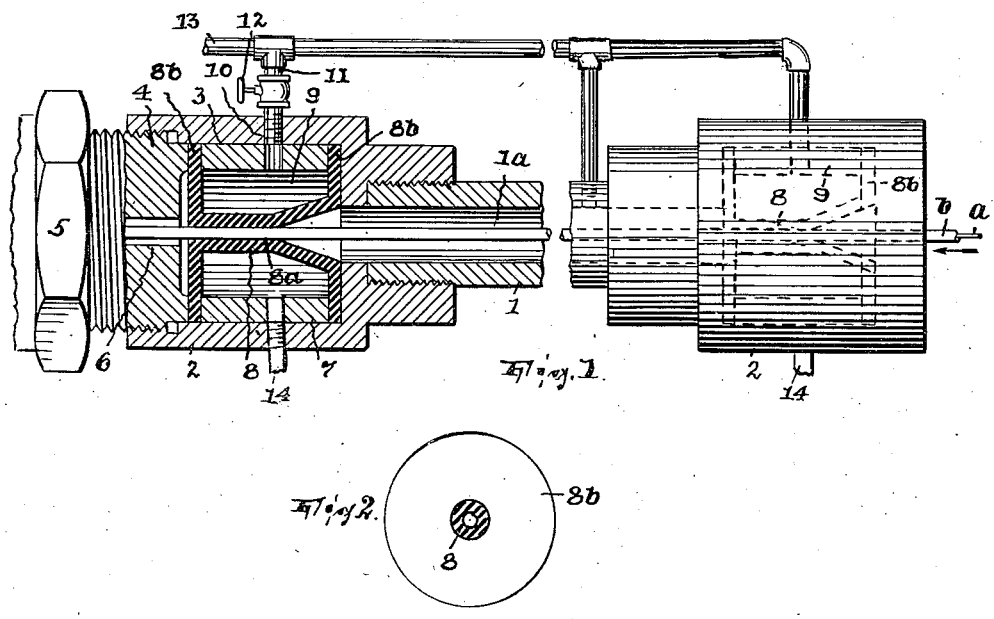

2,307,575

UNITED STATES PATENT OFFICE 2,307,575

APPARATUS FOR TREATING CONTINUOUSLY SHEATHED CORES

Benjamin H. Davis, Ridgewood, N. J.

Application April 18, 1941, Serial No. 389,150

6 Claims. (Cl. 18—6)

In the art of treating with fluid under pressure (as by steam in vulcanizing) the rubber or equivalent plastic coating applied (as by extrusion) to a wire or equivalent core the coated core is made to pass through a suitable chamber containing the fluid. This is taught, for instance, by the patent to Lamplough, No. 1,689,205. In that case sealing means is used comprising, essentially, disks of rubber having a common central orifice for the coated core and slits extending radially from the orifice, a metal disk having a central orifice and also slitted radially, such disks being all conical in a common direction, and means to exert pressure axially on the disks with the purpose of allowing only a limited amount of the vulcanizing fluid to escape via the orifices in the disks so that it will serve as a cushion between the coating and the disks.

Given structure having a chamber to confine fluid under pressure and through which to pass a lengthy core having a plastic coating to be treated by such fluid, whether in a vulcanizing or other treatment, said structure having an orifice extending therethrough from exterior to interior of the chamber and through which to pass the thus coated core, my invention contemplates that the portion of such structure which extends clear around and next adjacent to the orifice shall exist substantially uninterruptedly of elastic yielding plastic material to form with the coating a substantial if not an hermetic seal. If, as in the example herein disclosed, said structure embodies in itself two orifices for passage of the coated core to and from the chamber, it may be characterized as above set forth with respect to the portion thereof extending clear around each orifice. Preferably the orifice is generally cylindrical and has a length greater than its diameter whereby to ease the passage of the coated core therethrough and "iron" or smooth out the surface of the coating where the latter remains susceptible of such action. The entering end of the orifice may also be at least generally convergent in the direction of passage of the coated core. What I contemplate is to preserve a substantial seal, or prevent appreciable escape of the treating fluid in the chamber, and have the sealing effected without stripping or localized disturbance of the coating but rather with a molding or shaping of the coating so as to eliminate irregularities at its surface possibly existing at least before it enters said chamber and so is still susceptible of re-shaping.

My invention also contemplates that the said portion shall be subject itself to constricting pressure. To this end I have provided therearound a sealed space or chamber to receive fluid under pressure.

In the drawing,

Fig. 1 shows the apparatus in side elevation, partly in section; and

Fig. 2 shows one bushing 8 in transverse section.

A tubular part 1 of suitable length has screwed onto its ends heads 2 of substantially identical form but relatively reversed, each providing a space 3 here cylindrical and coaxial and of greater diameter than the bore 1a of part 1. A plug 4 is screwed into the left-hand head and on it is screwed a union 5 by which to affix the structure shown to some support, the plug having a passage 6 coaxial with the bore of part 1 and of greater diameter than the coating b of the wire a being treated. A similar plug is assumed to exist in the other head. In and fitting the space 3 of each head is a sleeve 7. The remaining parts in both heads and now to be described are alike:

All parts of the structure as so far described are rigid (as metal) and are herein treated as constituting the body part or body of such structure excepting the sleeve 7. The aforesaid portion as it exists in each head is here formed by an elastic yielding plastic (as rubber) bushing 8 having an axial orifice 8a, being held in the space 3 with its orifice coaxial with the bore of part 1. In any cross section said portion exists with its orifice circumferentially continuous, or without interruption, as slits, in its surface. It is provided with terminal integral exterior flanges 8b flanking sleeve 7 and respectively flanked by the inner end of space 3 and the plug 4, there being a fluid space 9 around the bushing and between its flanges; this space is sealed by screwing in the plug to compress the flanges. The intake or right-hand end of the bore 8a is preferably tapered, as shown.

Let the space 1a of part 1 be a vulcanizing chamber to which steam under pressure is to be admitted, as will apepar. The coated wire (the coating having been applied before reaching the apparatus shown) travels in the direction of the arrow through the orifices 8a of both bushings and if it substantially fills each orifice the corresponding bushing coacts therewith to form substantially a seal, depending, of course, on the degree of pressure in chamber 1a; if such pressure is excessive for this purpose a counter-pressure may be developed in chamber 9, whereby to increase the constricting pressure of the bushing, thus: A port, as 10, extends through each head and sleeve 10 to chamber 9 and this receives a pipe 11 having a controlling valve 12. This pipe may be connected to any source of fluid under pressure, but it is here shown connected to the pipe 13 by which fluid (as steam, in the case of vulcanizing) is supplied to chamber 1a.

Preferably the orifice 8a is, as shown, actually a bore having a length greater than its diameter.

In some of the appended claims I claim the bushing when subject to constricting fluid pressure regardless of whether or not its orifice is circumferentially continuous, or without interruptions, as slits, in its surface.

So as to preserve the spaces 9 free of condensate in the case where steam is used to exert pressure on the bushings there will usually be outlet pipes 14 leading from such spaces and having suitable pressure-controlled means, not shown.

Having thus fully described my invention, what I claim is:

1. Apparatus for treating the moldable plastic coating of a lengthy core by passing the coated core through fluid under pressure, said apparatus consisting of structure including a rigid body having a chamber for confining the fluid and a bushing formed of elastic yielding plastic material and held in said body and having an orifice extending from the exterior to the interior of the chamber and to be penetrated by the coated core, said bushing being uninterrupted next adjacent and clear around and immediately adjacent the orifice whereby to form substantially a seal with the coated core and said structure having around the bushing a sealed space for containing fluid under pressure.

2. Apparatus for treating the moldable plastic coating of a lengthy core by passing the coated core through fluid under pressure, said apparatus consisting of structure including a rigid body having a chamber for confining the fluid and a bushing formed of elastic yielding plastic material and held in said body and having an orifice extending from the exterior to the interior of the chamber and to be penetrated by the coated core, said bushing being uninterrupted next adjacent and clear around and immediately adjacent the orifice whereby to form substantially a seal with the coated core and said structure having around the bushing a sealed space for containing fluid under pressure, in combination with means for introducing fluid under pressure to said space.

3. Apparatus for treating the moldable plastic coating of a lengthy core by passing the coated core through fluid under pressure comprising, in combination, with a rigid body having a chamber for confining the fluid, another chamber formed open to the first-named chamber and a passage leading from the second-named chamber to the exterior of said body, an elastic yielding bushing confined by and sealing off a portion of said second-named from said first-named chamber and passage and having an orifice connecting said first-named chamber and passage and to be penetrated by the coated core.

4. Apparatus for treating the moldable plastic coating of a lengthy core by passing the coated core through fluid under pressure comprising, in combination, with a rigid body having a chamber for confining the fluid, another chamber formed open to the first-named chamber and a passage leading from the second-named chamber to the exterior of said body, an elastic yielding bushing confined by and sealing off a portion of said second-named from said first-named chamber and passage and having an orifice connecting said first-named chamber and passage and to be penetrated by the coated core, and means to introduce fluid under pressure to said space.

5. Apparatus for treating the moldable plastic coating of a lengthy core by passing the coated core through fluid under pressure comprising, in combination, with a rigid body including at least two parts one of which has a chamber for confining the fluid under pressure and another chamber formed open to the first-named chamber and having a surface facing from the latter chamber and the other of which parts is held in the second-named chamber opposite said surface and has a passage leading from said second-named chamber to the exterior of the body, an elastic yielding bushing in said second-named chamber having an orifice connecting the first-named chamber and passage and to be penetrated by the coated core and also having exterior circumferential flanges, and a sleeve surrounding the bushing and interposed between said flanges and existing with the latter clamped between said other part and said surface.

6. Apparatus for treating the moldable plastic coating of a lengthy core by passing the coated core through fluid under pressure comprising, in combination, with a rigid body including at least two parts one of which has a chamber for confining the fluid under pressure and another chamber formed open to the first-named chamber and having a surface facing from the latter chamber and the other of which parts is held in the second-named chamber opposite said surface and has a passage leading from said second-named chamber to the exterior of the body, an elastic yielding bushing in said second-named chamber having an orifice connecting the first-named chamber and passage and to be penetrated by the coated core and also having exterior circumferential flanges, a sleeve surrounding the bushing and interposed between said flanges and existing with the latter clamped between said other part and said surface, and means to introduce fluid under pressure between said bushing and sleeve.

BENJAMIN H. DAVIS.